United States Patent Office 3,344,014
Patented Sept. 26, 1967

3,344,014
SAFETY GLASS
Richard Watkin Rees, Wilmington, Del., assignor to E. I. du Pont de Nemours and Company, Wilmington, Del., a corporation of Delaware
No Drawing. Filed Feb. 28, 1963, Ser. No. 261,844
11 Claims. (Cl. 161—203)

This application is a continuation-in-part of my copending applications Ser. No. 135,147 filed Aug. 31, 1961 and Ser. No. 168,839 filed Jan. 25, 1962, both now abandoned.

This invention relates to laminated articles and particularly to glass-thermoplastic laminates having excellent shatter resistance.

Considerable commercial use has been made of plastic interlayers in the instruction of multi-component safety glass exhibiting a resistance toward shattering when struck by objects capable of fracturing at least one of its exterior surfaces. Resins which are used in such laminates must be capable of being interlayered with the glass readily, must exhibit high toughness and good adhesion to the glass over a broad use-temperature range and must retain these properties for long periods of time. Moreover, when the safety glass is used as optical glass, the plastic must possess good visible transparency. The narrow restrictions on resin properties coupled with the high cost of resin synthesis and lamination have limited markedly the number and types of plastic materials which are suitable for use in glass laminates. Moreover, since the resins employed in commercial applications usually must be compounded with plasticizers to achieve the essential properties indicated above, pre-lamination handling problems are created due to the tackiness imparted to the sheeted resin surface by the plasticizer.

It is an object of this invention to provide improved glass laminates. It is a further object to provide glass laminates which have excellent shatter resistance and optical clarity. A still further object is to provide a resin which is economically amenable to use as an interlayer for bonding together opposing surfaces of glass. Still another object is to provide a resin which can be converted into non-tacky sheeting and subsequently handled with ease. Other objects will become apparent hereinafter.

The objects of the present invention are achieved by laminating between opposing glass surfaces at elevated temperatures a copolymeric interlayer, said copolymer comprised of at least 50 mole percent bound alpha-olefin having the formula $RCH=CH_2$, wherein R is a radical selected from the group consisting of hydrogen and alkyl radicals having 1 to 8 carbon atoms, and 0.2 to 25 mole percent bound alpha,beta-ethylenically unsaturated carboxylic acid, with at least 10% of the acid groups of said copolymer being neutralized either with one or more metal ions having a valence of 1 to 3 or with an organic polyamine having at least two carbon atoms and a dissociation constant of at least $1 \times 10^{-8}$. The base copolymer as used herein is a polymer of an alpha-olefin and an alpha,beta-ethylenically unsaturated carboxylic acid and may be prepared by a variety of methods. Thus, the base resin may be obtained by the copolymerization of a mixture of the alpha-olefin and the carboxylic acid group-containing comonomer. This method is preferred for the copolymers of ethylene employed in the present invention. In one such process, a mixture of the comonomers is introduced into a polymerization environment maintained at high pressures, e.g., 50 to 3000 atmospheres, and elevated temperatures, e.g., 150 to 300° C., together with a free radical polymerization initiator, such as an azo compound or a peroxide. The polymerization may be substantially a bulk polymerization or, if desired, suitable inert solvents, e.g., water or benzene, may be employed. The present invention, however, is not limited to copolymers obtained by direct copolymerization of an alpha-olefin with an alpha,beta-ethylenically unsaturated carboxyl group containing comonomer. The base resin employed herein may, also, be obtained by the grafting of the acidic comonomer to a poly-alpha-olefinic base resin. Such graft copolymers may be obtained by exposing a solution or finely divided powder of the alpha-olefinc resin to ionizing radiation in the presence of the acidic comonomer. In another method, this solution or finely divided powder may be contacted with a peroxide and a solution of the acidic comonomer. The grafting technique is particularly employed with olefinic polymers obtained from alpha-olefins of higher molecular weight than ethylene, since these monomers do not readily lend themselves to direct copolymerization with the acidic comonomer. Copolymers of the alpha-olefin and acid group-containing comonomer, also, may be prepared by copolymerizing the alpha-olefin with a derivative of an alpha,beta-ethylenically unsaturated carboxylic acid and subsequently treating the polymer to form the free acid. For example, hydrolytic or pyrolytic techniques may be employed to form an acid group-containing copolymer from an esterified copolymer. Since the above polymerization techniques have been described in great detail in the literature, no further explanation is necessary.

The copolymer base resin need not necessarily be limited to a two-component copolymer. Thus, although the alpha-olefin content of the copolymer should be at least 50 mole percent, mixtures of alpha-olefins may be employed. Moreover, other polar group-containing comonomers may be added along with the acidic type comonomer. As indicated above, the alpha-olefins employed in the copolymer base resin are alpha-olefins having the general formula $RCH=CH_2$, wherein R is either a hydrogen or an alkyl group having 1 to 8 carbon atoms. Suitable olefins include ethylene, propylene, 1-butene, 3-methyl-1-butene, 1-pentene, 4-methyl-1-pentene, 1-hexene, 1-heptene, 1-octene, 1-decene and the like. Particularly preferred are the 1 to 4 carbon atom alpha-olefins. While the concentration of the alpha-olefin in the copolymer is at least 50 mole percent, it preferably is at least 70 mole percent. The second comonomer employed in the formation of the base resin is an alpha,beta-ethylenically unsaturated carboxylic acid, and preferably one containing 3 to 8 carbon atoms. Examples of this comonomer include acrylic acid, methacrylic acid, ethacrylic acid, itaconic acid, maleic acid, fumaric acid, and monoesters of said dicarboxylic acids, such as methyl hydrogen maleate, methyl hydrogen fumarate and ethyl hydrogen fumarate. Also, operable herein as comonomers are anhydrides of alpha,beta-ethylenically unsatured carboxylic acids. The concentration of acidic comonomer in the base resin is 0.2 to 25 mole percent, and preferably 1 to 15 mole percent. Other polar group-containing comonomers may be copolymerized along with the alpha-olefin and the carboxyl group-containing comonomer. The scope of the base copolymers suitable for use in the present invention is illustrated by the following: ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/chlorotrifluoroethylene/methacrylic acid copolymers, polyethylene/acrylic acid graft copolymers, polyethylene/methacrylic acid graft copolymers, poly(ethylene, propylene)/acrylic acid graft copolymers, poly(ethylene, 1-butene)/methacrylic acid graft copolymers, poly(ethylene, vinyl acetate)/methacrylic acid graft copolymers, polypropylene/acrylic acid graft copolymers, polypropylene/methacrylic acid graft copolymers, poly(1-butene)/acrylic acid graft copolymers, poly(3-methyl-1-butene)/acrylic acid graft copolymers and polyethylene/acrylic acid, ethyl acrylate graft copolymers.

The copolymeric base resin may be modified by various reactions which do not interfere with subsequent neutralization by the aforesaid mono-, di- or trivalent metal ions or the organic polyamines. Halogenation of the base resin is an example of such polymer modification. The preferred base copolymers are those obtained by direct copolymerization of ethylene with at least one monocarboxyl group-containing comonomer. These resins are preferred because they contain the acid group randomly distributed throughout the copolymer. Such random distribution enhances the effect of the neutralization by the mono-, di- or trivalent metal ion or the organic polyamine.

In order to achieve the requisite characteristics for a safety glass interlayer, the aforesaid acidic copolymers must be neutralized either with a compound of a mono-, di- or trivalent metal ion or with an organic polyamine containing at least 2 carbon atoms, preferably 2 to 18 carbon atoms, and having a dissociation constant of at least $1 \times 10^{-8}$. The reaction mechanism involved in the formation of these modified copolymers, hereafter referred to, also, as ionic copolymers, is not entirely understood and their exact structures are not completely known. In the case of the metal ion-neutralized copolymer, it has been determined by infrared analysis that there must be an ionized carboxyl group $(COO^-)$, as shown by the presence of an absorption band at about 6.4 microns. There, also, is noted with increasing neutralization a decrease in the intensity of a crystallinity band appearing in the base resin at 13.7 microns, and a substantial decrease in the intensity of the 10.6 micron band which is characteristic of the unionized carboxyl group $(COOH)$. It consequently has been deduced that the properties of the metal ion-neutralized copolymers used herein result from an ionic attraction between the metal ion and one or more ionized carboxylic acid groups. This ionic attraction results in a form of crosslinking which occurs in the solid state. When the resin is molten and subjected to the shear stresses which occur during melt fabrication, the ionic crosslinks are ruptured and the polymers exhibit melt flow essentially the same as that of the unneutralized base copolymer. Either on cooling of the melt or in the absence of shear stress during fabrication the crosslinks are reformed and the resins exhibit the properties of a crosslinked material. In the case of the polyamine modified copolymers, it has been determined that the amine groups react with the acid groups of the copolymer to form an ammonium salt in which the reacted nitrogen atoms of the polyamine exist in the tetravalent ammonium state and in which the carboxylic acid group exhibits its ionized form. The latter may be noted from an infrared analysis which shows an absorption band at about 6.4 microns, a characteristic of the ionized carboxyl group $(COO^-)$. There, also, is noted with increasing neutralization a decrease in the intensity of a crystallinity band appearing at 13.7 microns in the base resin, and a substantial decrease in the intensity of the 10.6 micron band which is characteristic of the unionized carboxyl group $(COOH)$. Although it has been known heretofore in the art that organic polyamines can be reacted with carboxylic acid group-containing polymers, in all instances a crosslinked polymer has been obtained. On the other hand, a characteristic of the polyamine modified copolymers used in the present invention is that they have the same molecular weight as the copolymer base resin. The tentative explanation given for this unusual behavior of the partially neutralized copolymers is that the reaction of the polyamine with the acidic copolymer is intramolecular rather than intermolecular.

Regardless of which of the neutralizing agents are employed, that is whether it be a mono-, di- or trivalent metal ion or an organic polyamine, at least 10% of the acid groups of the copolymeric base resin must be neutralized. In general, it is desirable to react at least 40% of the acid groups, and preferably 40 to 80% of the available acid groups, in the copolymeric base resin. The required degree of neutralization will depend upon a variety of factors including the number of available acid groups and the molecular weight of the copolymer. For example, solid state properties can be held essentially constant by decreasing the degree of neutralization as the molecular weight or the acid content of the copolymeric base resin is increased. In the use of a polyamine as the neutralizing agent, some consideration must be given to the length of the carbon atom chain between the nitrogen atoms. For example, for copolymers having a high concentration of carboxylic acid groups, short chain polyamines are more efficient, while in the case of copolymers having a low carboxylic acid content, long chain polyamines are preferred. This finding is consistent with the theory that the amine reacts intramolecularly with the acid groups of the copolymer. In order to achieve suitable reaction of the organic amine with the carboxylic acid groups in the copolymer to form the ionized ammonium salt structure characteristic of the modified copolymers used in the present invention, it is essential to employ polyamines having a dissociation constant of at least $1 \times 10^{-8}$. Examples of preferred polyamines which are employed in the neutralization of the copolymeric base resins are the aliphatic diamines such as ethylene diamine, tetramethylene diamine, hexamethylene diamine, octamethylene diamine, decamethylene diamine, and bis(para-aminocyclohexyl)methane.

Other amines which are equally useful include piperazine, diethylene triamine, beta,beta'-diaminodiethyl ether, beta,beta'-diaminodiethyl thioether and the like. In the reaction of the above amines with the carboxylic acid groups of the copolymeric base resin no by-products of any kind are formed. If desired, the amines may be added in the form of their ammonium salts. In this case, the by-product formed must be removed in order to shift the equilibrium and drive the neutralization to completion. Examples of such ammonium salts include alkylene diammonium formates, acetates, methoxides, ethoxides carbonates and bicarbonates. The by-products obtained by reacting these salts and the acidic copolymers can by volatilized from the reaction mixture and the neutralized copolymer is identical to that obtained directly from the acidic copolymer and the corresponding organic diamine.

The metal ions which are suitable for forming the ionic copolymers used in the present invention comprise mono-, di- and trivalent metal ions. In particular, the mono-, di- and trivalent ions of metals selected from the group consisting of Groups I, II, III, IV–A, and VIII of the Periodic Table of Elements such as may be found on pages 448–9 of the Handbook of Chemistry and Physics, 41st edition, 1959, are suitable crosslinking metal ions. The preferred metals are the alkali metals and zinc. It is essential in order to achieve the ionic crosslinks that the crosslinking compound be water soluble. A compound is considered water soluble for the purpose of its use in the present invention if it is soluble with or without decomposition in water at 20° C. to the extent of at least 2 weight percent. Another requirement for the metal compound employed is that upon reaction with the carboxylic acid groups of the copolymer, a volatile by-product should be formed. Preferred metal salts used herein include formates, acetates, hydroxides of sufficient solubility, methoxides, ethoxides, nitrates, carbonates and bicarbonates of the aforesaid metal ions. Metal compounds which generally are not suitable include metal oxides because of their lack of solubility, metal salts of fatty acids forming non-volatile residues which remain in the polymer and metal coordination compounds which lack the necessary ionic character. It has been noted in the present invention that when metal ions are used as the neutralizing agent for copolymeric base resins formed from alpha,beta-unsaturated carboxylic acid comonomers containing more than one carboxyl group, it is preferable to employ a monovalent metal ion. When monocarboxyl group-containing comonomers are empolyed in the formation of the base resin, mono-, di- and trivalent metal ins are equally effective.

The base resin neutralization reaction is carried out under conditions which allow for a homogeneous distribution of the neutralizing agent in the base copolymer. No usual reaction conditions are essential except that the conditions should permit the volatilization of any by-product. For example, the neutralization reaction may be carried out by melt blending the base copolymer with the neutralizing agent using the various techniques which have been developed in the art. Thus, the materials may be blended on a rubber mill or in the many types of melt blend mixers which are known in the art. The base copolymer, also, may be dissolved in a suitable solvent and then mixed with the neutralizing agent at elevated temperatures. When an organic polyamine is used to neutralize the carboxylic acid groups, since no by-product is formed, the reaction may be carried out in a closed vessel such as the extruder which is used to fabricate the copolymer. When the reaction is carried out in contact with air, care must be taken that the reaction temperature is not excessively high. It has been found, e.g., that if the reaction temperature exceeds 300° C. when employing an organic polyamine, there is formed a crosslinked intractable resin. The explanation for this result may be that the reaction with the amine has proceeded beyond the ammonium salt formation and has resulted in the formation of an amide type structure.

The laminated structures of the present invention may be fabricated by conventional lamination techniques described in the art. If desired, the ionic copolymer used herein may be melted in place between the opposing surfaces which are to be laminated. The resin prior of this melting may be in a particulate form or in the form of a film or sheeting. The latter may be produced from particulate resin by compression molding or by extrusion techniques. Alternately, the plastic interlayer may be produced by flash evaporation of the solvent from a solution of the ionic polymer. When the ionic copolymers described herein are to be used for optical safety glass, it is desirable to achieve a balance between the number of carboxylic acid groups which are neutralized and the number which remain unneutralized since an increase in the former imparts improved toughness, clarity, and tensile properties to the resin, while an increase in the latter provides better adhesion to the glass.

The following examples are given to demonstrate but not necessarily limit the present invention.

Example I

A 500 gram sample of an ethylene/methacrylic acid copolymer containing 10 weight percent bound methacrylic acid and having a melt index of 5.8 (as measured by standard ASTM test D-1238-57T) is banded on a 6-inch rubber mill at 150° C. After the copolymer has attained the mill temperature, 24 grams of sodium methoxide dissolved in 100 cc. of methanol are added to the copolymer over a period of five minutes as working of the copolymer on the mill is continued. After melt blending for an additional 15 minutes, the initially soft fluid melt becomes stiff and rubbery although the copolymer can still be readily handled on the mill. The resulting product is found to have a melt index of less than 0.1. Moldings made from this composition are transparent whereas similar moldings made from the copolymeric base resin are opaque.

Example II

To 50 grams of an ethylene/methacrylic acid copolymer containing 10 weight percent bound methacrylic acid and having a melt index of 5.8, while being milled at a temperature of 125 to 135° C. on a six-inch rubber mill, are added gradually 6.3 grams of magnesium acetate tetrahydrate in 25 cc. of water. Milling is continued for 15 minutes by which time the evolution of acetic acid ceases. The product has a melt index of 0.12 and may be fabricated into resilient moldings.

Example III

To 25 grams of a high density polyethylene containing 4.3 weight percent acrylic acid grafted thereto by peroxide grafting and having a melt index of 6.0, a stiffness of 113,000 p.s.i. (as measured by ASTM Test D-474-58T), and a yield strength of 3900 p.s.i. (as measured by ASTM Test D-412-51T), are added 2.0 grams of sodium hydroxide in 25 cc. of methanol while the composition is banded on a rubber mill at a temperature of 150° C. The resultant product has a melt index of 0.92, a stiffness of 140,000 p.s.i. and a yield strength of 4400 p.s.i.

Example IV

Table I shows the physical properties of ionic copolymers obtained from an ethylene/methacrylic acid copolymer with mono-, di- and trivalent metal ions as the neutralizing agent. The ethylene/methacrylic acid copolymer employed contains 10 weight percent bound acid comonomer and has a melt index of 5.8. In addition to the improvements shown in the table, all these copolymers exhibit excellent bend recovery, a characteristic not exhibited by the base copolymer. The tests are carried out on compression molded sheets of the ionic copolymer.

TABLE I

| Metal Cation | Metal Anion | Weight Percent of Crosslinking Agent | Melt Index, g./10 min. | Yield Point in p.s.i.[1] | Elongation in Percent[1] | Ult. Tens. Strength in p.s.i.[1] | Stiffness[2] | Transparency (visual) |
|---|---|---|---|---|---|---|---|---|
| | | | 5.8 | 890 | 553 | 3,400 | 10,000 | Hazy. |
| Na+ | CH3O- | 4.8 | 0.03 | 1,920 | 330 | 5,200 | 27,600 | Clear. |
| Li+ | OH- | 2.8 | 0.12 | 1,906 | 317 | 4,920 | 30,000 | Do. |
| Sr++ | OH- | 9.6 | 0.19 | 1,954 | 370 | 4,900 | 32,400 | Do. |
| Mg++ | CH3COO- | 8.4 | 0.12 | 2,176 | 326 | 5,862 | 23,800 | Do. |
| Zn++ | CH3COO- | 12.8 | 0.09 | 1,926 | 313 | 4,315 | 30,170 | Do. |
| Al+++ | CH3COO- | 14 | 0.25 | 1,035 | 347 | 3,200 | 15,000 | Do. |

[1] ASTM D-412-51T.  [2] ASTM D-747-58T.

Example V

Solutions of 50 gram batches of an ethylene/methacrylic acid copolymer, containing 10 weight percent bound methacrylic acid and having a melt index of 5.8, in 250 cc. of xylene are reacted with 2.5, 5 and 7.5 grams of hexamethylene diamine at 130° C. In each of the three additions the reaction mixture is agitated for 15 minutes. The addition of the hexamethylene diamine does not cause an increase in viscosity. The products are recovered by precipitation with methanol and washed with water and acetone. The resultant dry products are compression molded into sheets 0.060 inch thick and the physical properties are measured (described in Table II).

Example VII

In order to show the effect of the extent of neutralization and, also, the number of acid groups of the comonomer available for neutralization on the adhesion of the ionic copolymer interlayers to glass, a series of experiments is carried out using glass laminates prepared by the procedure described in Example V except that a film of polyethylene terephthalate is placed between one of the glass surfaces and the ionic copolymer. After lamination, the unbonded glass is removed, the glass-ionic copolymer composite is cut into strips 3 centimeters wide, and the strength of the glass-copolymer bond is determined by a peel strength measurement. The peel strengths

TABLE II

| Percent Hexamethylene Diamine | | Melt Index, g./10 min. | Stiffness, p.s.i.[2] | Yield Strength, p.s.i.[2] | Ultimate Tensile Strength,[1] p.s.i. | Ultimate Elong.,[1] Percent | Transparency (visual) | Resilience (Bend Recovery) |
|---|---|---|---|---|---|---|---|---|
| Weight | Stoichiometric | | | | | | | |
| 0 | 0 | 5.8 | 9,900 | 890 | 3,414 | 550 | Hazy | Limp. |
| 5 | 74 | 4.8 | 24,220 | 1,320 | 3,880 | 450 | Transparent | Good. |
| 10 | 148 | 5.2 | 38,400 | 1,600 | 3,423 | 370 | ----do---- | Very good. |
| 15 | 223 | 5.2 | 40,000 | 1,734 | 3,560 | 380 | ----do---- | Do. |

[1] ASTM-D-412-51T. [2] ASTM-D-747-58T.

Example VI

The 75% neutralized ethylene/methacrylic acid copolymer prepared in Example I is compression molded, using an appropriate die, between the 18 inch platens of a hydraulic press at 150° C. and 30,000 pounds platen pressure into 12″ x 12″ x 0.015″ sheets. The sheeted resin is conditioned at 20% relative humidity and 70° F. for 24 hours. A glass laminate is prepared as follows: a conditioned 0.015″ sheet is inserted between two clear 12″ x 12″ x ⅛″ glass plates and the sandwich is placed in an oven at 90° C. for about 15 minutes, then passed through a pair of rubber coated nip rolls to remove air and returned to the oven for 45 minutes. After again passing through the nip rolls the sandwich is placed in an oil-containing autoclave and the pressure in the autoclave is increased to 225 p.s.i.g. while the temperature is increased to 150° C. After 90 minutes the glass laminate is removed, cleaned, inspected to ensure freedom from bubbles and then evaluated by means of a break height test. The test is conducted using the equipment described in the American Standards Association Code Z-26.1-1950, "American Standards Safety Code for Safety Glazing Materials for Glazing Motor Vehicles Operating on Land Highways," Section 5.12, Impact Test No. 12. The test is carried out at 0, 70 and 120° F. by determining the break height at which 50% of the interlayers in the laminates are ruptured by the ½-lb. steel ball. Break height results are shown below. For comparison, data are given to exemplify a glass laminate fabricated as above but using a commercial, 0.015″ thick, plasticized polyvinyl butyral as the interlayer.

TABLE III.—BREAK HEIGHT (IN FT.)

| Interlayer | 0° F. | 70° F. | 120° F. |
|---|---|---|---|
| 76% neutralized ionic ethylene/10% methacrylic acid copolymer. | 50 | 45 | 35 |
| 30% neutralized ionic ethylene/10% methacrylic acid copolymer. | 31 | 51 | 45 |
| Plasticized polyvinyl butyral | 17-20 | 40-45 | 19-22 | in pounds/3 centimeters necessary to strip various ethylene/methacrylic acid copolymers from glass at a pulling angle of 180° using an Instron Universal Tester operated at a crosshead speed of 20 inches per minute are shown below in Table IV. Included therein are tensile strengths of the copolymers as measured by ASTM test method D-412-51T (at room temperature, 37% per second elongation). The neutralizing ion is sodium except where noted.

TABLE IV

| Weight percent methacrylic acid in copolymer | Mole percent acid groups neutralized | Peel strength (lbs./3 cm.) | Tensile strength (p.s.i.) |
|---|---|---|---|
| 5 | 76 | <0.4 | 3,340 |
| 10 | 75 | 0.41 | 5,050 |
| 10 | 60 | 1.2 | 4,400 |
| 10 | 50 | 2.9 | 4,290 |
| 10 | 40 | 4.2 | 4,400 |
| 16 | 76 | 0.95 | 4,750 |
| 18 | 30 | 7.4 | |
| 18 | 20 | 13 | |
| 18 | 10 | 14.1 | |
| 18 | 0 | 15 | |
| 18 | [1] 20 | 13 | |

[1] Magnesium.

Example VIII

Various ethylene copolymers are neutralized employing techniques similar to those described in Examples I–III. Table V shows the copolymers treated, the neutralizing agent, the degree of neutralization and a few selected physical properties (obtained by means of ASTM tests previously described). All the ionic copolymers shown in Table V are fabricated into resilient moldings. When each sample is compression molded into 0.015″ sheets, then laminated and evaluated according to the procedure described in Example VI, break height results comparable to the maximum values shown in Table III are achieved.

TABLE V

| Exp't | Comonomer and Wt. percent in Polymer | Melt Index (Before Neut'n) | Mole percent acid Groups Neut'd | Neutralizing Agent | Melt Index (After Neut'n) | Stiffness (p.s.i.) | Yield Strength (p.s.i.) | Ultimate Tensile Strength (p.s.i.) | Ultimate Elongation (percent) | Peel Strength (lbs./3 cm.) |
|---|---|---|---|---|---|---|---|---|---|---|
| A | 20% methacrylic acid | 7.0 | 40 | Na+ | 0.44 | 69,000 | 2,800 | 5,400 | 270 | 4.4 |
| B | ...do... | 7.0 | 40 | Hexamethylene diamine | | | | | | |
| C | 20% vinyl acetate, 10% methacrylic acid | 18 | 50 | Na+ | 4.0 | 4,600 | 550 | 5,050 | 510 | 6.0 |
| D | ...do... | 18 | 50 | Zn++ | | | | | | |
| E | ...do... | 18 | 50 | Hexamethylene diamine | | | | | | |
| F | 20% methyl methacrylate, 10% methacrylic acid | | 40 | Na+ | | | | | | |
| G | ...do... | | 40 | Zn++ | | | | | | |
| H | ...do... | | 40 | Hexamethylene diamine | | | | | | |

From the above examples it has been determined that particularly preferred neutralizing agents include sodium and zinc ions and hexamethylene diamine. By organic polyamine as the term is used herein is meant an organic amine containing at least two carbon atoms and at least two nitrogen atoms. Included therein are organic compounds containing primary, secondary or tertiary amine groups or combinations thereof. The only limitation placed upon the organic polyamines useful in the present invention is that they must have a dissociation constant of at least $1 \times 10^{-8}$.

I claim:

1. A laminated product having a plurality of opposing glass surfaces bonded together with an ionic copolymer comprised of at least 50 mole percent of a bound alpha-olefin having the formula $RCH=CH_2$, wherein R is a radical selected from the group consisting of hydrogen and alkyl radicals having 1 to 8 carbon atoms, and 0.2 to 25 mole percent of a bound alpha,beta-ethylenically unsaturated carboxylic acid, wherein said ionic copolymer at least 10 percent of the carboxylic acid groups are neutralized by a member selected from the group consisting of metal ions having a valence of 1 to 3 inclusive and selected from the group consisting of the metals of Groups I, II, III, IV-A and VIII of the Periodic Chart of the Elements, and organic polyamines having at least two carbon atoms and a dissocation constant of at least $1 \times 10^{-8}$.

2. A laminated product having a plurality of opposing glass surfaces bonded together with an ionic copolymer comprised of at least 50 mole percent of a bound alpha-olefin having the formula $RCH=CH_2$, wherein R is a radical selected from the group consisting of hydrogen and alkyl radicals having 1 to 8 carbon atoms, and 0.2 to 25 mole percent of a bound alpha,beta-ethylenically unsaturated carboxylic acid, wherein said ionic copolymer at least 40 percent of the carboxylic acid groups are neutralized by a member selected from the group consisting of metal ions having a valence of 1 to 3 inclusive and selected from the group consisting of the metals of Groups I, II, III, IV-A and VIII of the Periodic Chart of the Elements, and organic polyamines having 2 to 18 carbon atoms and a dissociation constant of at least $1 \times 10^{-8}$.

3. A laminated product having a plurality of opposing glass surfaces bonded together with an ionic copolymer comprised of at least 70 mole percent of a bound alpha-olefin having the formula $RCH=CH_2$, wherein R is a radical selected from the group consisting of hydrogen and alkyl radicals having 1 to 8 carbon atoms, and 1 to 15 mole percent of a bound alpha,beta-ethylenically unsaturated carboxylic acid, wherein said ionic copolymer at least 40 percent of the carboxylic acid groups are neutralized by a member selected from the group consisting of metal ions having a valence of 1 to 3 inclusive and selected from the group consisting of the metals of groups I, II, III, IV-A and VIII of the Periodic Chart of the Elements, and organic polyamines having 2 to 18 carbon atoms and a dissociation constant of at least $1 \times 10^{-8}$.

4. A laminated product having a plurality of opposing glass surfaces bonded together with an ionic copolymer comprised of at least 70 mole percent of a bound alpha-olefin having the formula $RCH=CH_2$, wherein R is a radical selected from the group consisting of hydrogen and alkyl radicals having 1 to 4 carbon atoms, and 1 to 15 mole percent of a bound alpha,beta-ethylenically unsaturated carboxylic acid having 3 to 8 carbon atoms, wherein said ionic copolymer at least 40 percent of the carboxylic acid groups are neutralized by a member selected from the group consisting of metal ions having a valence of 1 to 3 inclusive and selected from the group consisting of the metals of Groups I, II, III, IV-A and VIII of the Periodic Chart of the Elements, and organic polyamines having 2 to 18 carbon atoms and a dissociation constant of at least $1 \times 10^{-8}$.

5. A laminated product having a plurality of opposing glass surfaces bonded together with an ionic copolymer comprised of at least 50 mole percent of bound ethylene units and 0.2 to 25 mole percent of bound acrylic acid units, wherein said ionic copolymer at least 10 percent of the carboxylic acid groups are neutralized by a member selected from the group consisting of sodium and zinc ions and hexamethylene diamine.

6. A laminated product having a plurality of opposing glass surfaces bonded together with an ionic copolymer comprised of at least 50 mole percent of bound ethylene units and 0.2 to 25 mole percent of bound methacrylic acid units, wherein said ionic copolymer at least 10 percent of the carboxylic acid groups are neutralized by a member selected from the group consisting of sodium and zinc ions and hexamethylene diamine.

7. A laminated product having a plurality of opposing glass surfaces bonded together with an ionic copolymer comprised of bound vinyl acetate units, at least 50 mole percent of bound ethylene units and 0.2 to 25 mole percent of bound methacrylic acid units, wherein said ionic copolymer at least 10 percent of the carboxylic acid groups are neutralized by a member selected from the group consisting of sodium and zinc ions and hexamethylene diamine.

8. A laminated product having a plurality of opposing glass surfaces bonded together with an ionic copolymer comprising the reaction product of: (a) a copolymer having at least 50 mole percent of a bound alpha-olefin $RCH=CH_2$, wherein R is a radical selected from the group consisting of hydrogen and alkyl radicals having 1 to 8 carbon atoms and 0.2 to 25 mole percent of a bound alpha,beta-ethylenically unsaturated carboxylic acid; and (b) a reactant selected from the group consisting of a compound of a metal having a valence of 1 to 3 inclusive and selected from the group consisting of the metals of Groups I, II, III, IV-A and VIII of the Periodic Chart of the Elements, said compound having a solubility in water of at least 2 weight percent at 20° C., and an organic polyamine having at least two carbon atoms and a dissociation constant of at least $1 \times 10^{-8}$, said reactant being employed in sufficient quantity to neutralize at least 10 percent of the carboxylic acid groups of said copolymer.

9. A laminated product having a plurality of opposing glass surfaces bonded together with an ionic copolymer comprising the reaction product of: (a) a copolymer having at least 50 mole percent of bound ethylene units and 0.2 to 25 mole percent of bound acrylic acid units; and (b) a reactant selected from the group consisting of zinc and sodium compounds having a solubility in water of at least 2 weight percent at 20° C. and hexamethylene diamine, said reactant being employed in sufficient quantity to neutralize at least 10 percent of the carboxylic acid groups of said copolymer.

10. A laminated product having a plurality of opposing glass surfaces bonded together with an ionic copolymer comprising the reaction product of: (a) a copolymer having at least 50 mole percent of bound ethylene units and 0.2 to 25 mole percent of bound methacrylic acid units; and (b) a reactant selected from the group consisting of zinc and sodium compounds having a solubility in water of at least 2 weight percent at 20° C. and hexamethylene diamine, said reactant being employed in sufficient quantity to neutralize at least 10 percent of the carboxylic acid group of said copolymer.

11. A laminated product having a plurality of opposing glass surfaces bonded together with an ionic copolymer comprising the reaction product of: (a) a copolymer having bound vinyl acetate units, at least 50 mole percent of bound ethylene units and 0.2 to 25 mole percent of bound methacrylic acid units; and (b) a reactant selected from the group consisting of zinc and sodium compounds having a solubility in water of at least 2 weight percent at 20° C. and hexamethylene diamine, said reactant being employed in sufficient quantity to neutralize at least 10 percent of the carboxylic acid groups of said copolymer.

References Cited

UNITED STATES PATENTS

| | | | |
|---|---|---|---|
| 2,400,139 | 5/1946 | Roland | 161—204 |
| 2,798,053 | 7/1957 | Brown | 260—88.1 |
| 2,925,174 | 2/1960 | Stow | 260—2.5 |
| 3,264,272 | 8/1966 | Rees | 260—78.5 |

ALEXANDER WYMAN, *Primary Examiner.*

W. J. VANBALEN, *Assistant Examiner.*